United States Patent Office 3,403,676
Patented Oct. 1, 1968

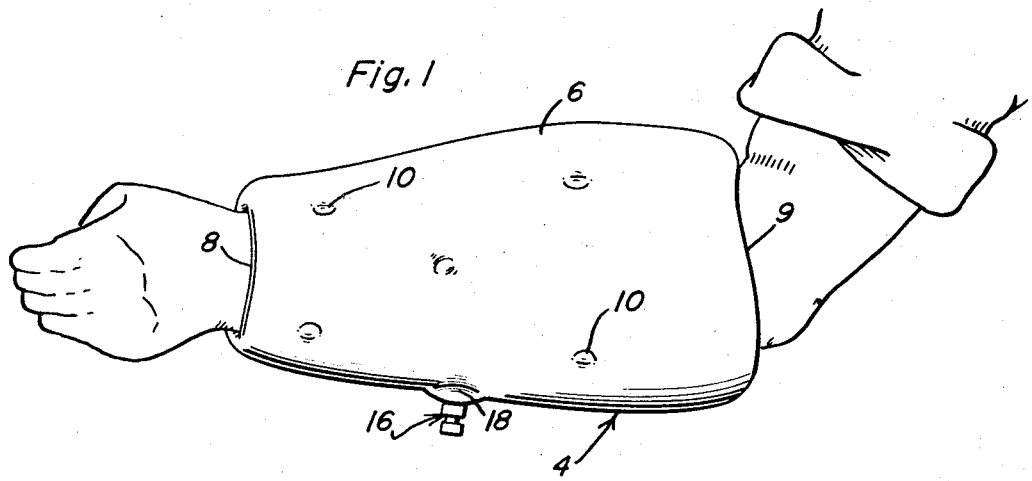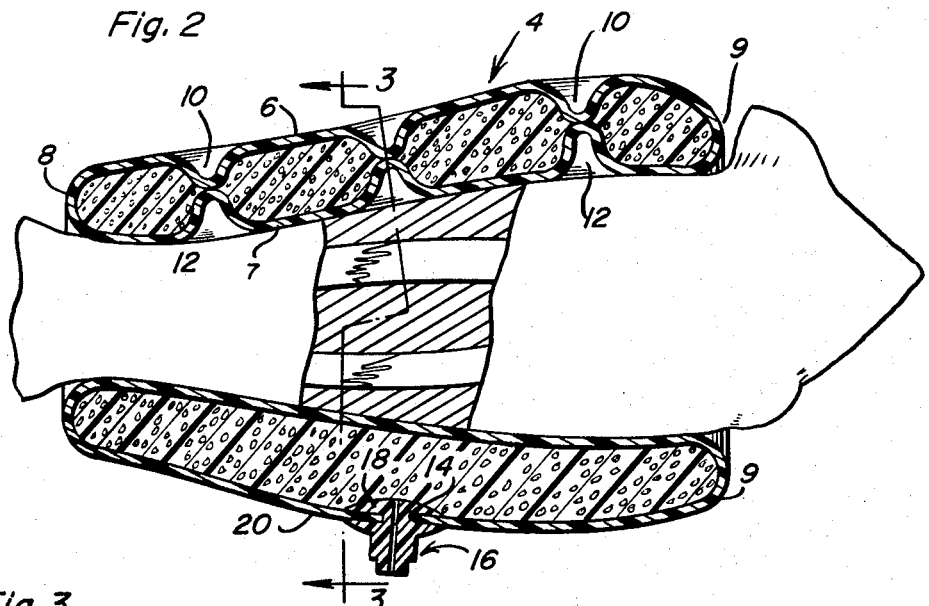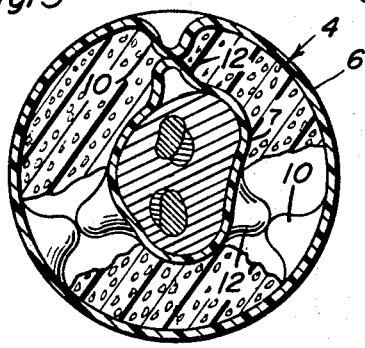
De Lamar J. Gibbons
INVENTOR.

3,403,676
PLASTIC FOAM SPLINT
De Lamar J. Gibbons, P.O. Box 35,
Lewiston, Utah 84320
Filed Nov. 12, 1965, Ser. No. 507,399
5 Claims. (Cl. 128—87)

ABSTRACT OF THE DISCLOSURE

A sleeve of thin pliant clear plastic film whose inner and outer concentric walls have their respective ends united and sealed. The hollow chamber is charged with premixed plastic foam (equal portions of Arothane 8740A and Arothane 8774B) and is transformed into a fracture bridging and restoring cast or splint. It provides the required tensile strength, modulus of elasticity, good molding and self-shaping properties. The walls are pliable but joined by end-to-end teat-like indentations which limit overexpansion of the over-all sleeve and provide restraining stability and uniform retention of the plastic shape-giving and maintaining form.

---

The present invention relates to special purpose appliances such as are expressly designed and structurally adapted to encase components of a fractured bone in a manner to provide support means and pertains, more particularly, to stabilizing splints, and casts.

Persons conversant with the field of endeavor herein under advisement are well aware that prior art bone setting casts and splints, such as plaster of paris casts, are many and varied and that, generally speaking, such casts are not only difficult to apply and remove, they are uncomfortably heavy and much too rigid.

There has long existed a need for an improved and time and labor saving comfortably wearable splint. Accordingly, it is an object in the matter at hand to advance the art of splints and, having done so, to effectually solve this problem.

In carrying out the present inventive concept a self-adapting conformably fitting sleeve is utilized. This sleeve is made of thin pliant plastic film and characterized by inner and outer walls defining a chamber. The respective end portions of the walls are united and sealed in such a manner that by charging and inflating the chamber with plastic foam (polyurethane foam for example) the thus filled and inflated sleeve is effectually transformed into the desired fracture bridging bone restoring cast or splint.

The pliant film-like plies of the sleeve have coacting portions distributively interconnected by heat-sealed or bonded components which conjointly provide the desired dimensional stability, that is restraining stability against over-expansion, whereby to condition the chamber for reception and adequate retention of the liquid plastic foam (prepolymer and resin-catalyst material).

Another aspect has to do with a plastic sleeve which is transformable into a firm setting cast. To the ends desired polyethylene has been found to be highly advantageous. It provides the desired mechanical properties such as tensile strength, modulus of elasticity, good resistance to outdoor aging, is possessed of good molding and self-shaping characteristics, is transparent, and substantially odorless.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective which shows a splint or cast constructed in accordance with the principles of the present invention and in use on a fractured or broken arm;

FIG. 2 is a central longitudinal view on a larger scale showing the splint inflated to its normally expanded state with shape imparting polyurethane foam or an equivalent plastic foam;

FIG. 3 is a section on the section line 3—3 of FIG. 2.

The plastic material polyethylene from which the sleeve is currently being made is possessed of the requisite inherent properties insofar as tensile strength and other mechanical characteristics are concerned, embodies stability and all such properties and those which are common to this transparent film-type lightweight material. While the ctst or splint may be described as such that it performs to provide protective and supportive needs, it takes the form of an open-ended sleeve denoted by the numeral 4. This sleeve embodies an outer film or wall 6 and an opposed inner companion wall 7. These components (as drawn) may give the impression that the sheet material is thick. Actually, that is in practice, it is a thin film highly pliant and yet capable of retaining the given cast-like shape shown, for instance in FIG. 1. The forward end 8 is fashioned into a suitable seal as is the rearward or inner end 9. These ends are shown in the drawing convexly rounded but obviously individual walls (sheets of film) could be provided with their coacting marginal edges heat sealed to provide the container or bag. At distributively spaced points the two walls are spot-welded, that is bonded together. The bonding and dimensional stability components are shown as paired and coordinating dimples 10 and 12 whose crests or terminal ends abut and are heat sealed (not detailed). It will be understood that the spot welded over-expansion limiting components 10 and 12 are illustrated in somewhat "over-size" form in order to emphasize the fact that any prescribed number of coacting portions of the walls 6 and 7 can be spot welded and linked together to provide a cellular chamber which is such that it can be effectively filled with the desired extrudable self-soldifying material so that the finished product may be caused to conform to the coacting portions of the limb and when the filler media hardens and rigidifies, the thus constructed splint will immobilize the fractured bone as shown in FIG. 2. An aperture 14 is provided with a filler neck 16 having a fitting or adapter collar 18 sealed and properly joined to the median part of the outer wall as designated generally at 20. The pre-mixed liquid plastic is injected through the filler neck 16 into the receiving and molding chamber thus providing the desired disposable splint.

Trial and error and many experimental developments involving the herein disclosed innovation have shown that the plastic foam most aptly suited is a polyurethane foam, more specifically Arothane 8740A (a prepolymer) and Arothane 8744B (a resin-catalystic material) and which combine and when properly mixed (not detailed here) achieve the inflating and self-rigidifying result desired, a cast or splint. This splint is light in weight, durable, strong and conformingly comfortable whereby to attain the restorative results which have been achieved.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For use in orienting, maintaining and restoring related component parts of a fractured arm, limb or other impaired body part and temporarily immobilizing and gradually normalizing the same, a cast-like splint comprising an elongated open-ended snug-fitting limb encasing plastic sleeve embodying like inner and outer concentric walls made of clear plastic film, said walls having their respective terminal end portions united and sealed by interconnecting web-like end walls to form a hollow filler media receiving chamber, said chamber being charged and inflated with self-solidifying plastic foam.

2. The splint defined in and according to claim 1, and wherein said plastic film is pliant polyethylene possessed of requisite tensile strength, modulus of elasticity, resistance to aging, is virtually odorless, and is transformable into a firm but light in weight splint.

3. The splint defined in and according to claim 2, and wherein said chamber is amply stable that it lends itself to the inherent pressure of a full charge of plastic foam without the likelihood of being ruptured.

4. The splint according to claim 1 and wherein predetermined opposed minimal but complemental portions of said inner and outer walls are heat-bonded in a manner to interconnect said walls at distributed points throughout said chamber and also to unite the walls and provide the dimensional stability capable of offsetting over-expansion of the chamber when it is amply filled from a manually controllable supply source.

5. The structure defined in claim 4, and wherein a median portion of the outer wall is provided with an integrated outstanding filler neck capable of accommodating means which is attachable thereto in a manner to deliver the inflating, expanding and self-solidifying plastic foam into said chamber.

References Cited

UNITED STATES PATENTS

| 2,943,859 | 7/1960 | Koski et al. | 128—87 |
| 3,186,405 | 6/1965 | Bailey et al. | 128—87 |
| 3,212,497 | 10/1965 | Dickinson | 128—87 |
| 3,332,415 | 7/1967 | Ericson | 128—87 |

FOREIGN PATENTS

| 735,700 | 6/1966 | Canada. |
| 440,113 | 1/1927 | Germany. |

L. W. TRAPP, *Primary Examiner.*